Sept. 20, 1971     F. FRUEHWIRTH     3,606,004
PLANT PACKAGE AND SHIPPING CONTAINER FOR POTTED PLANTS
Filed July 10, 1969     2 Sheets-Sheet 1
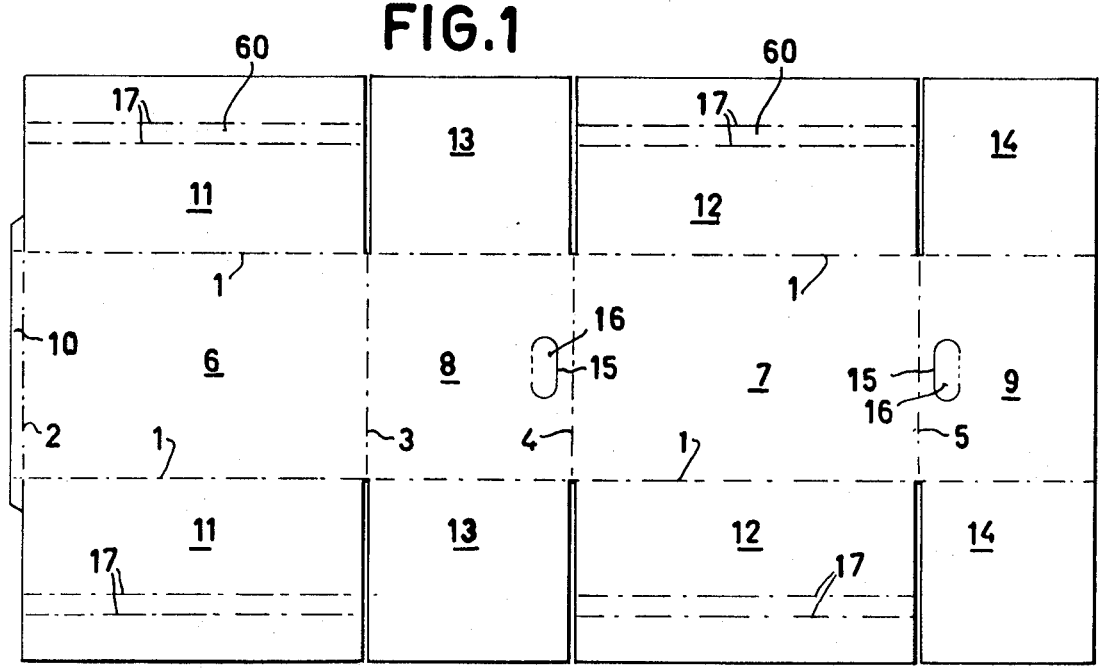
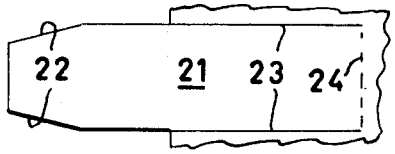
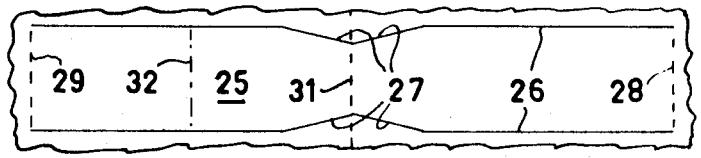
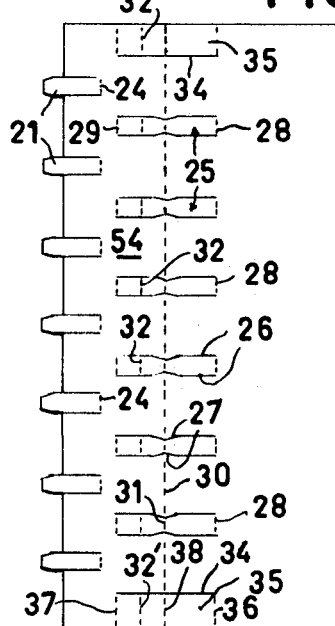
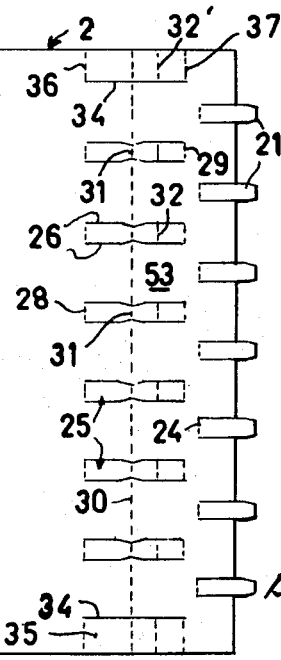
INVENTOR.
Franz Fruehwirth
ATTORNEYS

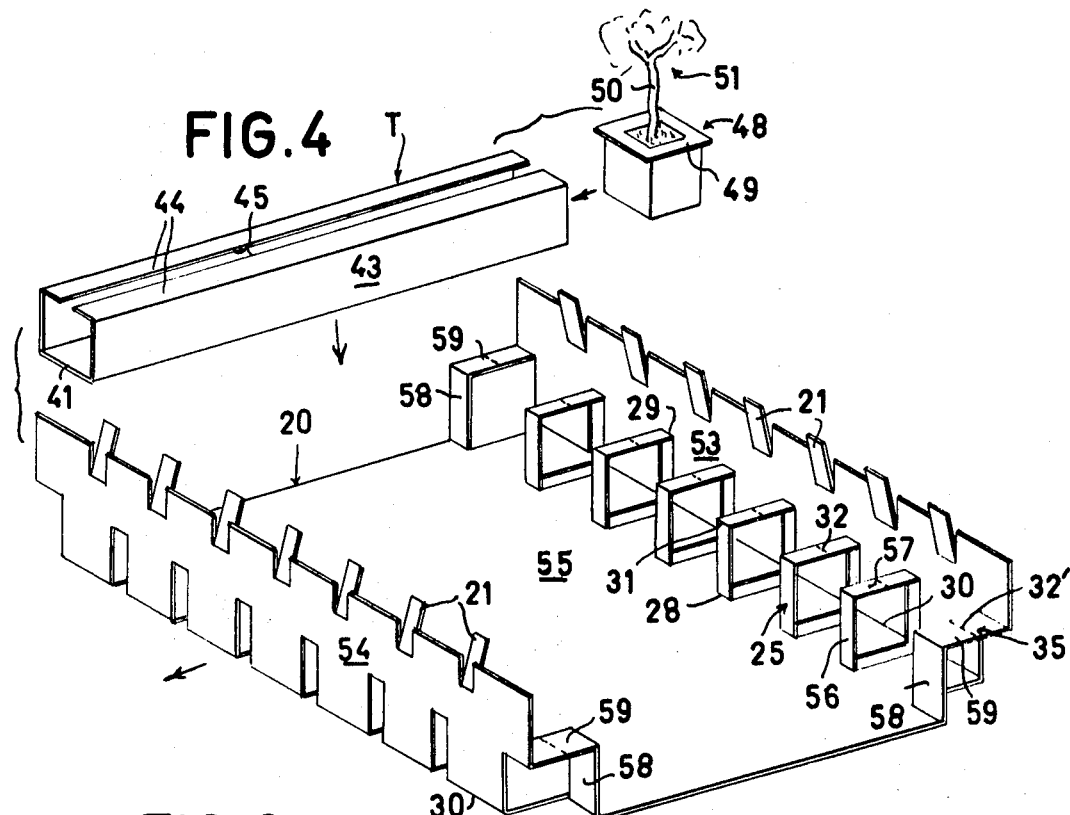
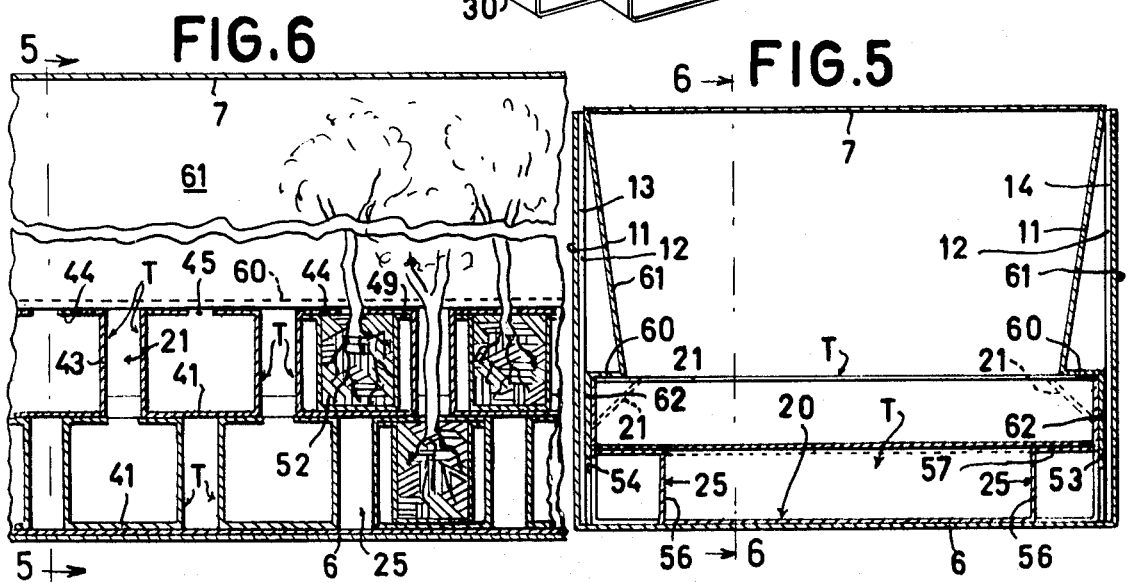

United States Patent Office 3,606,004
Patented Sept. 20, 1971

3,606,004
PLANT PACKAGE AND SHIPPING CONTAINER FOR POTTED PLANTS
Franz Fruehwirth, 137 Seeman Drive,
Encinitas, Calif. 92024
Filed July 10, 1969, Ser. No. 840,798
Int. Cl. B65d 5/48, 85/52
U.S. Cl. 206—65R
8 Claims

ABSTRACT OF THE DISCLOSURE

A plant package including an outer container of fibreboard and a pair of superposed horizontal rows of trays supported on a fibreboard pad on the bottom of the container, each tray holding a row of potted plants therein with said trays held on said pad in spaced relation for passage of the plant stems into the upper portion of the container, and closure flaps on said container closing positions and vice versa, said flaps formed to provide horizontally-extending ledges positioned over the upper sides of the ends of the upper row of trays to lock said trays and potted plants down against movement during handling of the container when the closure flaps are secured in closed positions.

SUMMARY

The commercial shipping of potted plants, particularly in fibreboard containers such as made from conventional corrugated materials, involves the problem of economics from the standpoint of material, time required for packing, security of plants against injury, the capacity of the containers and other considerations.

One of the objects of the present invention is to provide a shipping container for potted plants that is economical to make, easily and quickly packed, and that will compactly hold a relatively large number of plants, including the pots and soil therein, against detrimental injury to the plants and loss of soil during handling, which may include considerable mishandling of the containers.

Another object of the invention is the provision of a shipping container for potted plants that includes a pair of opposed end walls, either of which may be opened for access to the plants, and which end walls when closed provide means for securely holding the potted plants in the container, spaced from the top wall thereof a sufficient distance to provide a space for the stems and foliage of the plants, even though the container is severely handled, and even inverted.

An added object of the invention is the provision of a folding fibreboard container having end closure flaps providing opposite lateral end walls, for closing the container after a load of a predetermined height, substantially less than heights of the container, is positioned on the horizontal bottom wall of the latter, and which end closure flaps, when closed, provide means for securely holding said load on said bottom wall against movement relative to each other and to the container during handling.

A still further object of the invention is the provision of a shipping container for potted plants, such as poinsettias, and other, in which several layers of potted plants are adapted to be fully enclosed and safely packaged for shipment, the potted plants including stems and foliage.

Other objects and advantages will appear in the description and in the drawings.

DESCRIPTION OF THE DRAWINGS

FIG. 1 is a plan view of a blank from which the container is formed.

FIG. 2 is a blank from which the bottom pad for supporting and spacing the trays for the potted plants is formed, and which pad in turn is to be supported on the bottom of the container within the latter.

FIG. 2a is an enlarged fragmentary plan view of a portion of the blank of FIG. 2.

FIG. 2b is an enlarged fragmentary plan view of the spacer portion of the blank of FIG. 2.

FIG. 3 is a plan view of a blank from which one of the trays is formed.

FIG. 4 is an exploded isometric view showing the blank of FIG. 2 bent for providing the pad for supporting and spacing the trays with one of the trays bent from the blank of FIG. 3 in a position above the pad for positioning on the latter, and one rectangular flanged pot at one end of the tray for positioning in the latter.

FIG. 5 is a reduced size cross-sectional view at line 5—5 of FIG. 6.

FIG. 6 is a fragmentary enlarged cross-sectional view at line 6—6 of FIG. 5, the view being broken in height, and several trays having potted plants therein.

DETAILED DESCRIPTION

The blank of FIG. 1 is rectangular and is preferably of conventional, double-faced corrugated cardboard having a pair of parallel, spaced folding creases 1 parallel with and positioned intermediate two of its parallel edges providing a central portion between said folding creases.

Spaced pairs of folding creases 2, 3, 4, 5 extend across said central portion at right angles to, and between, said pair of creases 1, which pairs of creases cooperate with creases 1 to define the outlines of top and bottom wall 6, 7, and the opposed vertical end walls 8, 9 of the container to be formed. Crease 2 is adjacent one end of the blank and defines the juncture between a tab 10 adjoining wall 6, that is to be connected by any suitable means, such as glue, staples, etc., with the end wall 9 at the opposite end of the blank for setting up the container. The corrugations in the board are preferably parallel with creases 1.

Pairs of separate side enclosure flaps 11, 12 respectively adjoin the top and bottom walls 7, 6 along creases 1, while pairs of separate closure flaps 13, 14 of corresponding size respectively adjoin end walls 8, 9 along creases 1.

End walls 8, 9 may or may not be formed with conventional hand holes for lifting the container when it is formed and filled. Assuming the wall 6 is the bottom wall of the container, hand holes 15 may be formed in end walls 8, 9 adjacent to but spaced from creases 4, 5 respectively, and positioned centrally between the creases 1. Tabs 16 may remain in each hand hole if light is to be excluded during shipment, which tabs remain connected with walls 8, 9 along one of their horizontally-extending edges and are readily sprung inwardly into the container under the pressure of fingers of the hands entering the holes 15 for lifting the container.

Wall 6 is the bottom wall of the container, and is positioned horizontally on a support when the blank is folded to form the container, the minimum creasing requirement for this particular blank for accomplishing the results of this invention apart from the creases already enumerated would be the formation of a pair of spaced folding creases 17 in closure flaps 12 parallel with creases 1, each pair being spaced an equal distance from the crease 1 nearest thereto.

If no hand holes are provided, it would be immaterial whether wall 6 or 7 were the bottom wall, in which case both walls may be formed with a pair of creases 17, with the creases in each flap in longitudinal alignment, inasmuch as the bending of the closure flaps along creases 17 in flaps 11 or 12, as will later appear, depends upon which wall, 6 or 7, is the bottom wall. Wall 6 will be considered the bottom wall in this description.

A blank, generally designated 20 (FIG. 2) forms a pad to support the potted plants within the container formed from the blank of FIG. 1. This pad, carrying the potted plants, is to be positioned within the set-up container through an open lateral side of the latter.

Blank 20 is preferably of conventional, double faced corrugated cardboard and is of rectangular shape, except for a row of elongated, strip-like extensions 21 equally spaced along two opposite edges of the blank, which edges will be called a "front" edge and a "rear" edge. The other two edges will be called the "side edge." The corrugations in blank 20 preferably extend longitudinally between said front and rear edges, or parallel with said side edges, and the extensions 21 along the front and rear edges are in aligned pairs.

The side edges of extensions 21 are parallel except for slight convergence at their outer end portions in a direction toward their terminal outer ends as indicated at 22 (FIG. 2a). Approximately half, or slightly more than half of the length of each extension 21 may extend into the body of blank 20 between parallel cuts 23, and folding creases 24 extend across the terminal inner ends of said extensions.

Between the rows of extensions 21, but adjacent to each row is a row of strips 25 formed in the body of the blank 20. The rows of strips 25 are parallel with the rows of extension 21, and the spacing between said strips 25 in each row is the same as the spacing between the extensions 21 in each row of the latter.

Said strips 25 constitute the portions of blank 20 disposed between pairs of cuts 26 that are parallel, except for a slight convergence between their end portions, as at 27 (FIG. 2b) to form a restricted neck intermediate the ends of said strips, parallel folding creases 28, 29 are respectively formed on the blank at the ends of each strip 25, which creases are parallel with creases 24 that are at the inner ends of extensions 21. Creases 29 are at the ends of strips 25 that are nearest the front and rear edges of the blank 20. Folding creases 30, parallel with creases 28, 29, extend completely across the blank 20 between its side edges, and at 31 creases 30 extend across the necks of strips 25, midway between the ends of the latter. Folding creases 32, parallel with creases 31 extend across each strip 25 approximately midway between each crease 29 and 31.

The strips 25 in the rows thereof are offset transversely of their lengths, relative to the extensions 21, distances equal to one half the spacing between adjacent pairs of said extensions, and the strips 25 in one row thereof are in alignment with the strips 25 of the other row.

Outwardly of the end strip 25 of each row the blank 20 is formed with a slit or cut 34 that is parallel with the adjacent end strip and is spaced from the latter a distance equal to the spacing between each adjacent pair of strips 25, leaving a portion 35 of the blank, similar to each strip 25, but wider, between each cut 34 and the side edge of the blank nearest thereto (FIG. 2).

At this point it may be noted that the space between end extensions 21 of each row thereof, and the lateral or side edge of the blank respectively adjacent thereto, is the same as the spacing between the strips 25 of each adjacent pair, and is also the same as the spacing between the extensions 21 of each adjacent pair.

Said portions 35 are formed with transverse folding creases 36, 37, 38 and 32' that are in longitudinal alignment with creases 28, 29, 31, and 32 respectively.

Trays T (FIG. 4) for holding the potted plants are formed from oblong blanks 39 of corrugated fibreboard (FIG. 3). Each blank is formed with a central pair of spaced, parallel folding creases 40 parallel with the longitudinally extending edges of the blank. Said creases 40 define opposite edges of the bottom wall 41 of the tray, and folding creases 42 equally spaced from creases 40 and bottom wall 41 define the upper edges of a pair of corresponding side walls 43, the lower edges being along creases 40. The marginal portions 44 of the blank outwardly of and along creases 42 are each of a width slightly less than half the width of bottom wall 41. The corrugations of these blanks may extend perpendicular to the creases.

Pots generally designated 48 (FIGS. 4, 5) are provided for the plants. These pots are of uniform size and are of any suitable material, preferably of relatively tough, water proof plastic material molded to rectangular shape, such as square in cross sectional contour, each having a flange 49 around the upper edge.

When blank 39 is folded to form a tray, side walls 43 will be bent along creases 40 to vertical positions perpendicular to bottom wall 41 (FIG. 4) and the flanges 44 will be bent toward each other to substantially coplanar relation with the free edges along the marginal portions or flanges 44 in spaced, opposed relation, as indicated at 45.

The height of each pot 48 is preferably substantially equal to the inside height of side walls 43 of the tray, or the distance between the bottom walls 41 and flanges 44, and the space 45 between the free edges of the marginal portions 44 of each tray is sufficient to pass the stem 50 (FIG. 5) of the plant 51 that is planted in each pot.

The plant pots contain the soil material 52 in which the plants are planted and which material may extend substantially to the flanges or marginal portions 44.

In loading the trays, the pots, including the plants therein, may successively be inserted into one open end of each tray in adjoining relation and slid along the tray longitudinally thereof while the tray is filled, with the stems 50 extending through the space 45 between the marginal portions 44 of the trays. Said space 45 forms an elongated open-ended slot. The pots 48 as previously noted, are preferably square and the length of the flanges 49 along each side are such that the flanges on the end pots of the row in each tray will be substantially even with the end edges of the tray so there will be substantially no jostling of the pots longitudinally of the trays when they are in transit and the ends of the trays are closed.

It is also seen that the flanges or marginal portions 44 of the trays form top closures for the pots, except for the slot or space 45 through which the stems project.

In loading a container with the trays, the pad or blank 20 may be first loaded with the potted plants outside the container.

The opposite front and rear end portions 53, 54, of pad 20 are initially folded along creases 30 to positions extending vertically upwardly from the central portion 55 that is the bottom of the pad, and in these positions said portions 53, 54 will be at right angles to the central portion. Upon so folding the portions 53, 54, the strips 25 will be counterfolded along creases 28, 29, 31 to extend at right angles into the right angles formed by the central portion 55 of the pad 20 and the front and rear end portions 53, 54 of said pad (FIG. 4). Thus the sections 56 of each strip 25 at one side of crease 31 will extend vertically from the bottom wall or central portion 55 of the pad 20 and the section 57 at the outer side of crease 31 will extend horizontally from the front and rear end walls 53, 54, respectively, to their junctures at creases 31 (FIG. 4).

Each wider end portion 35 will also fold into the corners defined by the bottom wall 55 of the pad 20 and the front and rear end walls 53, 54 respectively, the same as strips 25, each having a vertical section 58 and a horizontal section 59 (FIG. 4). The lengths of sections 56, 58 are preferably substantially equal to the vertical height of a tray T when the marginal portions 44 are substantially coplanar.

The portions 57, 59 of strips 25, 35 are the portions having creases 32, 32' formed therein. In bending the blank 20 along creases 30 so that the portions 53, 54 are perpendicular to bottom wall 55, the strips 25 will similarly bend. The provision of creases 32, 32' enable quick counterbending of the strips 25, 35 by merely pushing the portions 57, 59 laterally inwardly from opposite ends of the pad 20 to bend said latter portions along creases 32, 32' thereby enabling said portions to be quickly swung to the positions shown in FIG. 4.

The spacing between the opposed surfaces of front and rear end walls 53, 54 of pad 20 is preferably equal to the lengths of trays T, and when the pad 20 is folded to the condition shown in FIG. 4, the loaded trays T may be lowered to positions in the spaces between the pairs of adjacent strips 25, and said strips 25 will now become spacers for the trays.

After a lower layer or row of trays positioned on the pad 20 with the strips or spacers 25 between them, a row of trays forming an upper layer is positioned on the lower layer, each upper tray being parallel with the trays therebelow. The trays of the upper row may be supported on the marginal portions 44 of the trays in the lower row holding the latter down, and the stems of the plants in the pots that are in the lower rows of trays will extend upwardly between the adjacent pairs of upper trays. Portions 57 of strips 25 may also function to support trays T.

The extensions 21 that are along the edges of the front and rear walls 53, 54 of the pad 20 are bent toward each other to positions between the pairs of trays in the upper row thereof to space the upper containers apart, and when said end walls 53, 54 are bent upwardly, the portions of said end walls between and alongside said extensions 21 and said strips 25 close the ends of the trays. Also, the upper horizontal sections 59 of the portions 35 at the ends of the rows of strips 25 function to partially support the end trays T of the upper row thereof.

The slanted end edges of the extension 21 facilitate positioning the trays relative to said extensions, as do the tapered edges of strips 25. For simplicity, slanted edges 22, 27 are not shown in FIG. 4.

The container formed from the blank of FIG. 1, when the latter is on its side, will have open lateral sides, or ends, adapted to be closed by the closure flaps 11–14. Considering wall 6 to be the bottom wall, and horizontal wall 7 to be the top wall, the flaps 12 on wall 7, at least, will be the ones formed with a pair of folding creases 17.

Closure flaps 11, 12 are preferably each of a length (longitudinally of creases 1) and of a width (normal to creases 1) to extend fully across the open ends of the containers when the latter is closed. The side flaps 13, 14 may extend only partially across the open ends where the horizontal width of the container between end walls 8, 9 is greater than the dimension between the open ends.

The distance between the pair of folding creases 17 in flaps 12 and the creases 1 at the junctures between flaps 12 and said top wall 7 is substantially equal to the distance between the loaded top trays T on a pad 20 and the top wall 7 of the container.

Assuming a pad 20 is filled with a pair of superposed horizontal rows of trays, such pad is inserted on bottom 6 into one open end of the outer container, the loading and sealing of the container may be as follows.

The closure flaps 12 are folded along folding creases 17 so that the portions 60 between the creases 17 of each pair will be projected horizontally outwardly relative to the inside of the container when the flaps 12 depend vertically from the top wall 7. The portions 60 thus provide horizontally disposed ledges that are adapted to extend over upwardly facing surfaces of the ends of the upper row of trays 17 in tight engagement with the upper marginal portions 44 of said trays to thereby firmly hold the two rows of trays against the bottom wall 6 of the container and to hold the marginal portions 44 of the trays down against the pots (FIG. 5).

The portion 61 of each end flap 12 above each ledge 60 (FIG. 6) will extend slantingly inwardly in a downward direction to form a truss-like brace and the portion 62 below each ledge 60 will extend vertically downwardly over and against the oppositely outwardly facing surfaces of the end walls 53, 54 of the pad 20.

When the side closure flaps 13, 14 are swung to coplanar closed positions over the end flaps 12 and the closure flaps 11 are swung upwardly against the flaps 13, 14 (FIG. 6) and are held closed by glue, tape, staples or any suitable means, the filled trays T are positively locked against opening or movement relative to each other and the outer container.

The loading techniques may obviously vary, inasmuch as certain steps may be performed substantially simultaneously or in succession, and jigs may be employed to assist in holding the pads, trays and containers during loading as well as other mechanical assists, but irrespective of the order of loading and the aids used, the final assembly shown in FIGS. 5, 6 is accomplished.

In the package that is formed, adequate space is provided within the container above the rows of potted plants for the foliage of the plants, including buds and flowers. The proportions of the blanks may vary to provide a larger or smaller space for foliage according to the type of plants, and the size of the container and pad may vary in size according to the number of trays or plants to be shipped. A package of the proportions shown in the drawings is adapted to carry over a hundred poinsettia cuttings in pots.

I claim:
1. A plant package comprising:
  (a) an outer, rectangular container having a top wall, bottom wall, lateral side walls and lateral end walls of which said end walls comprise closure flaps respectively hingedly connected with said top, bottom and side walls for swinging from outwardly extending open positions, in which the opposite ends of said container are open to closed positions closing said opposite ends,
  (b) a plurality of parallel rows of potted plants positioned within said container in side-by-side relation having stems thereon, said rows being supported by and above said bottom wall, and each plant including a plant holding pot containing soil material for each plant, with the stems of said plants extending centrally upwardly from said pots into the part of the container thereabove,
  (c) pot positioning and holding means within said container for positioning said potted plants in said rows and for holding said potted plants against movement relative to each other and relative to said container when said closure flaps at said two opposite ends of said container are held in closed positions, and means for holding said flaps in said closed position,
  (d) said pot positioning and holding means including means on one of said flaps at each of said ends of said container for holding pots and plants of said rows against falling in the event of inversion of said container when said flaps are held closed, and movable to release said pots and plants when said flaps are swung to open positions for removal of said pots and plants from said container,
  (e) said pot positioning and holding means including horizontally elongated parallel trays in each of which the pots of one of said rows of said potted plants are positioned, and
  (f) each of said trays having top portions extending from end to end thereof being disposed horizontally over the soil material in the pots in each tray from two opposite sides of the pots substantially to the stem of each plant and said means on one of said flaps at each of said ends of said containers extending over said top portions of said trays at the ends of the latter for holding said top portions horizontal over said pots and the soil material in the latter and for also holding said potted plants from said falling upon inversion of said container.

2. A plant package comprising:
   (a) an outer, rectangular container having a top wall, bottom wall, lateral side walls and lateral end walls of which said end walls comprise closure flaps respectively hingedly connected with said top, bottom and side walls for swinging from outwardly extending open positions, in which the opposite ends of said container are open to closed positions closing said opposite ends,
   (b) a plurality of parallel rows of potted plants positioned within said container in side-by-side relation having stems thereon, said rows being supported by and above said bottom wall, and each plant including a plant holding pot containing soil material for each plant, with the stems of said plants extending centrally upwardly from said pots into the part of the container thereabove,
   (c) pot positioning and holding means within said container for positioning said potted plants in said rows and for holding said potted plants against movement relative to each other and relative to said container when said closure flaps at said two opposite ends of said container are held in closed positions, and means for holding said flaps in said closed position,
   (d) said pot positioning and holding means including means on one of said flaps at each of said ends of said container for holding pots and plants of said rows against falling in the event of inversion of said container when said flaps are held closed, and movable to release said pots and plants when said flaps are swung to open positions for removal of said pots and plants from said container,
   (e) said parallel rows of potted plants being in each of a pair of superposed, horizontally-disposed layers, providing an upper layer and a lower layer,
   (f) said pot positioning and holding means including a pad of sheet material on said bottom wall on which said lower layer is supported,
   (g) spacing means on said pad for spacing apart the rows of potted plants in said upper and lower layers and for holding the rows of said upper layer offset transversely thereof relative to the rows of said lower layer for upward passage of the stems of the plants in said lower layer between the adjacent pair of rows of said upper layer,
   (h) said pot positioning and holding means including an upper and a lower layer of parallel, horizontally elongated and horizontally disposed trays in each of which the pots of a row of plants are positioned in adjoining relation, and
   (i) top portions on each of said trays integral therewith extending from end to end thereof disposed horizontally over the soil material in each pot from two opposite sides of each pot approximately to the stem of each plant providing a space between said top portions for said stems.

3. In a plant package as defined in claim 2;
   (j) said trays of said upper layer being supported directly on said top portions of the trays of said lower layer for holding said last-mentioned top portions horizontal, and the stems of the potted plants in said lower layer of trays extending upwardly between adjacent pairs of trays of said upper layer into the space within said container above said lower and said upper layers,
   (k) said lateral side walls and said end walls being of substantially greater height than the height of said pair of layers of trays to provide said space within said container and above said trays for the foliage in the stems of said potted plants.

4. In a plant package as defined in claim 3;
   (l) said one of said flaps at each of the ends of said ends of said container being the innermost of a plurality of closure flaps relative to inside said container and being hingedly connected with said top wall at said ends of said container for swinging downwardly from open positions to vertically disposed closed positions extending vertically over the ends of the rows of potted plants supported within said container by said bottom wall,
   (m) said innermost flaps each being formed with a pair of parallel horizontally extending folding creases spaced between the upper and lower edges of said innermost flaps, and the said means for holding said potted plants against falling comprising the portions between the creases of said pairs, said last-mentioned portions being horizontally disposed and extending over and against the upper sides of said top portions of said trays of said upper layer thereof when said innermost flaps are swung to closed positions with the parts of said innermost flaps below said pair of creases disposed vertically against the ends of said trays.

5. In a plant package as defined in claim 2;
   (j) each of said trays being open ended for insertion of the pots carrying said plants into said trays from one of their open ends and,
   (k) closure means on said pad extending over the open ends of said trays between the ends of the latter and said closure flaps above said closure flaps are in said closed positions.

6. In a rectangular, one-piece, fibreboard shipping container for potted plants, which container has vertically spaced, opposed, horizontal top and bottom walls and horizontally spaced opposed vertical side walls, and opposite ends with vertically spaced, opposed end walls which end walls comprise closure flaps respectively hingedly connected with said top, bottom and side walls for swinging outwardly from closed positions closing said ends to open position opening said ends, and vice versa:
   (a) plant supporting and holding means within said container removably supported on said bottom wall for supporting horizontal, parallel rows of potted plants having upwardly projecting stems, with said rows extending from one of the ends of said container to the other, and for holding said potted plants in said rows against displacement relative to each other both laterally and vertically when said container is closed,
   (b) securing means integral with said container at said ends thereof in releasable engagement with said potted plants, supporting and holding means for securing the latter in positions spaced below said top wall and against falling in the event of inversion of said container, when said closure flaps are in said closed positions,
   (c) said plant-supporting and holding means comprises an upper and a lower row of horizontally elongated, relatively rigid, generally tubular trays of fibreboard for respectively holding a horizontal row of the plant pots of said potted plants therein, and each tray having spaced opposed vertically extending side walls with horizontally extending flanges along the upper edges thereof extending toward each other and spaced apart for passage of the upwardly projecting stems of plants in said pots when the latter are in each tray,
   (d) the trays of said upper row thereof being supported on the flanges of the trays of adjacent pairs thereof in said lower row at the sides of spaces between the flanges on the trays of said lower row of trays for passage therebetween of the upwardly projecting stems of plants in said pots in the trays of said lower layer,
   (e) said securing means being in said releasable engagement with the upper surfaces of the flanges on the trays of said upper layer of trays at the ends of the latter, (f) said plant supporting and holding means further including a horizontal pad of sheet material extending over and against said bottom wall against which the lower layer of trays is supported, (g) spacing means integral with said pad extending between the trays in the row thereof of said upper layer and between the trays in the row thereof of said lower layer spacing the trays in each row thereof apart.

7. In a shipping container as defined in claim 6;

(h) said trays being open ended and said pad having closure means thereon extending vertically across the open ends of said trays, and spacing means being supported by the trays in each row thereof for so spacing the trays apart in each row.

8. A plant package comprising:

(a) an outer, rectangular container having a top wall, bottom wall, lateral side walls secured to said top wall and bottom wall, and lateral end walls, said end walls comprising closure flaps respectively hingedly connected with said top, bottom and side walls for swinging from outwardly extending open positions, in which the opposite ends of said container are open to closed positions closing said opposite ends, (b) a plurality of parallel rows of potted plants positioned within said container in side-by-side relation having stems thereon, said rows being supported by and above said bottom wall, and each plant including a plant holding pot containing soil material for each plant, with the stems of said plants extending centrally upwardly from said pots into the part of the container thereabove, (c) pot positioning means within said container for positioning said potted plants in said rows and for holding said potted plants against movement transversely of said rows, (d) said positioning means including holding means extending over and in engagement with the upper ends of the pots in each row, said holding means also extending over the soil material in the pots of said rows to approximately the stems of said plants, and (e) means on said end flaps in engagement with said holding means when said end flaps are in closed positions for holding said pots against falling in the events of inversion of said container, said means on said end flaps being movable with said end flaps to said open positions for releasing the pots of said rows for removal through the ends of said container.

References Cited

UNITED STATES PATENTS

| | | | |
|---|---|---|---|
| 2,511,542 | 6/1950 | Rau | 206—75 |
| 2,670,126 | 2/1954 | Frankenstein | 206—45.14 |
| 2,739,753 | 3/1956 | Wolf | 217—26 |
| 3,028,005 | 4/1962 | Shaffer | 206—65 |
| 3,055,494 | 9/1962 | Hepp | 229—28 |

WILLIAM T. DIXSON, Jr., Primary Examiner

U.S. Cl. X.R.

229—15, 42